United States Patent
Wen et al.

(10) Patent No.: US 9,885,618 B2
(45) Date of Patent: Feb. 6, 2018

(54) SYSTEM FOR MONITORING TEMPERATURE OF ELECTRICAL CONDUCTOR

(71) Applicant: 3M INNOVATIVE PROPERTIES COMPANY, St. Paul, MN (US)

(72) Inventors: Zhiguo Wen, Shanghai (CN); Zheng Huang, Shanghai (CN); Sihua Yuan, Shanghai (CN); Justin M. Johnson, Hudson, WI (US); Ronald D. Jesme, Plymouth, MN (US); Andrew P. Bonifas, Woodbury, MN (US); Terrence H. Joyce, Lakeville, MN (US); Jacob D. Chatterton, Roseville, MN (US); Yingyu Wang, Shanghai (CN); Xuetao Yu, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 132 days.

(21) Appl. No.: 14/888,856

(22) PCT Filed: May 3, 2013

(86) PCT No.: PCT/CN2013/075135
§ 371 (c)(1),
(2) Date: Nov. 3, 2015

(87) PCT Pub. No.: WO2014/176784
PCT Pub. Date: Nov. 6, 2014

(65) Prior Publication Data
US 2016/0076945 A1    Mar. 17, 2016

(51) Int. Cl.
*G01K 7/34* (2006.01)
*G01K 7/32* (2006.01)
(Continued)

(52) U.S. Cl.
CPC .............. *G01K 7/34* (2013.01); *G01K 1/143* (2013.01); *G01K 7/16* (2013.01); *G01K 7/24* (2013.01); *G01K 7/32* (2013.01)

(58) Field of Classification Search
CPC .... H01L 21/67248; G01K 7/34; G01K 1/024; G01K 7/00; G01K 7/24; G01K 7/32;
(Continued)

(56) References Cited

U.S. PATENT DOCUMENTS

| 3,452,597 A | 7/1969 | Grady, Jr. |
| 4,862,088 A | 8/1989 | Etienne |

(Continued)

FOREIGN PATENT DOCUMENTS

| CN | 101988856 | 3/2011 |
| CN | 102175341 | 9/2011 |

(Continued)

OTHER PUBLICATIONS

JP01012714A, Yoshida Kazuyoshi, Japan, Jan. 1989, Machine translation.*

(Continued)

*Primary Examiner* — Gail Kaplan Verbitsky
(74) *Attorney, Agent, or Firm* — Gregg H. Rosenblatt

(57) ABSTRACT

A system for monitoring temperature of an electrical conductor (31) enclosed in at least a (semi)conductive layer (13) comprising: a passive inductive unit (20), and a transceiver unit (40) and a control unit (50). The passive inductive unit (20) includes at least one temperature sensitive component and is configured to have a resonance frequency and/or Q value that vary with temperature of the electrical conductor (31). The transceiver unit (40) is configured to be electromagnetically coupled to the passive inductive unit (20) and to send out a signal representing the resonance frequency and/or Q value of the passive inductive unit (20). The (Continued)

transceiver unit (40) is further configured to communicate with the control unit (50) which ascertains the signal representing one or both of the resonance frequency and Q value, and which determines a value of the temperature of the electrical conductor (31) based on the ascertained signal representing one or both of the resonance frequency and Q value.

19 Claims, 10 Drawing Sheets

(51) Int. Cl.
    *G01K 11/26* (2006.01)
    *G01K 1/14* (2006.01)
    *G01K 7/24* (2006.01)
    *G01K 7/16* (2006.01)

(58) Field of Classification Search
    CPC .......... G01K 7/38; G01K 13/00; G01K 11/26; G01K 7/20; G01K 2003/145; G01K 7/36
    USPC ................. 374/117–119, 184, 141, 120, 208
    See application file for complete search history.

(56) References Cited

U.S. PATENT DOCUMENTS

| | | | | |
|---|---|---|---|---|
| 5,354,130 A * | 10/1994 | Seppa | ............... | G01K 7/36 374/117 |
| 5,466,614 A * | 11/1995 | Yakura | ............... | G01K 1/024 374/120 |
| 7,689,288 B2 * | 3/2010 | Stevenson | ............ | A61B 18/1492 607/60 |
| 7,852,092 B2 * | 12/2010 | Andarawis | ............ | G01N 27/041 324/693 |
| 8,339,149 B2 * | 12/2012 | Andarawis | ............ | G01N 27/041 324/658 |
| 8,348,504 B2 * | 1/2013 | Gregory | ............... | F01D 17/085 374/117 |
| 9,395,250 B2 * | 7/2016 | Malyshev | ............... | G01K 7/36 |
| 2008/0107150 A1 * | 5/2008 | Brummel | ............... | G01K 11/24 374/119 |
| 2010/0177801 A1 | 7/2010 | Geren | | |
| 2012/0268290 A1 | 10/2012 | Huang | | |
| 2014/0334521 A1 | 11/2014 | Wu | | |
| 2016/0223406 A1 * | 8/2016 | Wen | ............... | G01K 1/024 |
| 2016/0223408 A1 * | 8/2016 | Ghosh | ............... | G01K 7/38 |

FOREIGN PATENT DOCUMENTS

| | | |
|---|---|---|
| CN | 102279059 | 12/2011 |
| CN | 102539005 | 7/2012 |
| CN | 102589745 | 7/2012 |
| CN | 102607727 | 7/2012 |
| JP | 01012714 A * | 1/1989 |
| JP | H01-172714 | 7/1989 |
| JP | 10-227702 | 8/1998 |
| JP | 2004144683 A * | 5/2004 |
| JP | 2004-245607 | 9/2004 |
| JP | 2009-053025 | 3/2009 |
| JP | 2009053025 A * | 3/2009 |
| JP | 2010192649 | 9/2010 |
| NL | 1015906 | 2/2002 |
| SU | 970136 | 10/1982 |
| WO | WO 1996-11408 | 4/1996 |
| WO | WO 2007/122560 A2 | 11/2007 |
| WO | WO 2010/012296 | 2/2010 |
| WO | WO2012062022 A * | 5/2012 |

OTHER PUBLICATIONS

JP2009053025A, Hori Yasunobu, Japan, Mar. 2009, Machine translation.*
WO2012062022A, Wu Chengcai, China, May 2012, Machine translation.*
JP2004144683 A, Tamai Seiishiro, Japan, May 2004, Machine translation.*
Russian Search Report for Application No. 2015148029, dated Nov. 7, 2016, 2pgs.
International Search Report for PCT International Application No. PCT/CN2013/075135 dated Feb. 20, 2014, 6 pages.

\* cited by examiner

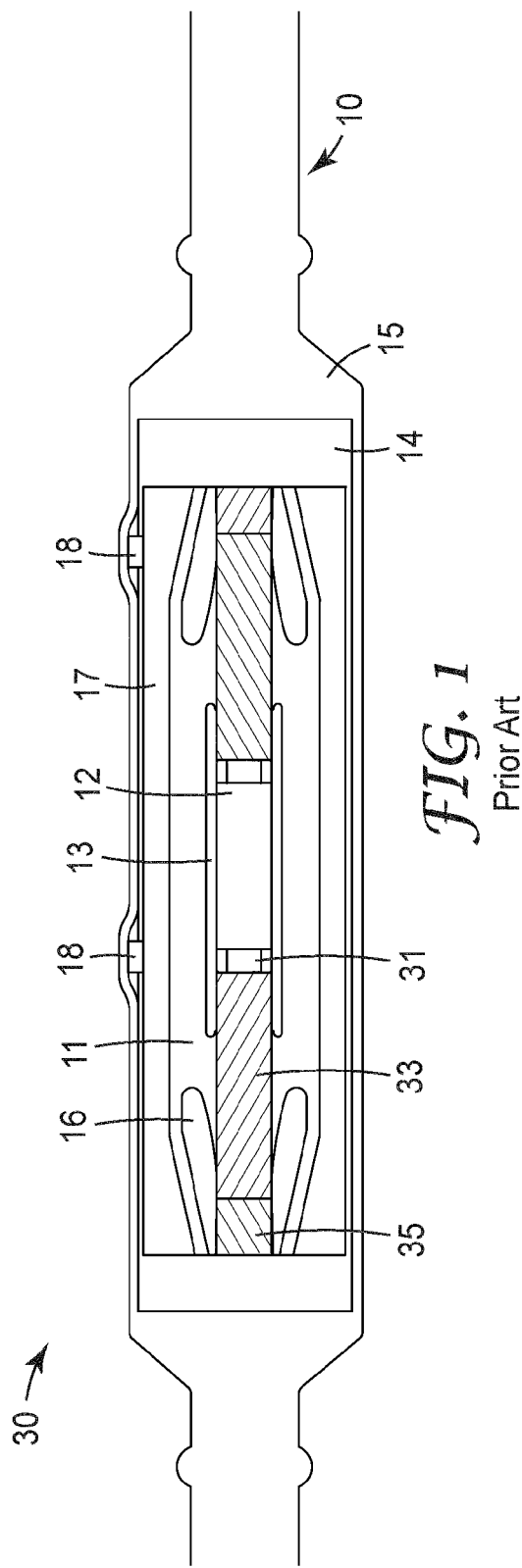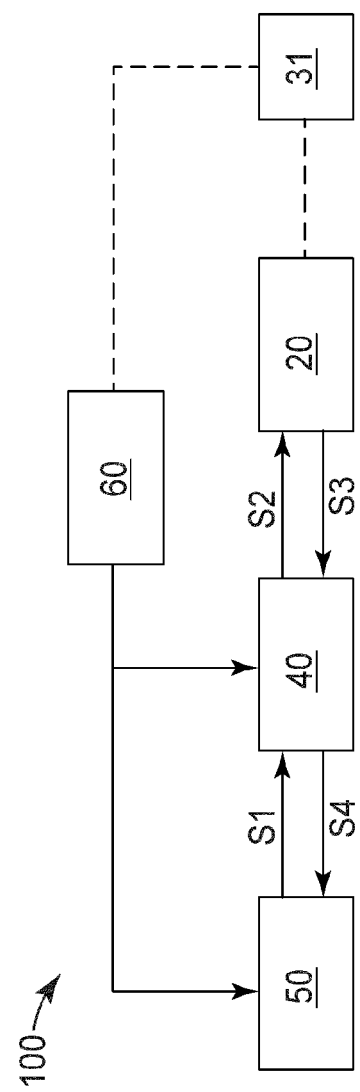
FIG. 1 Prior Art
FIG. 2

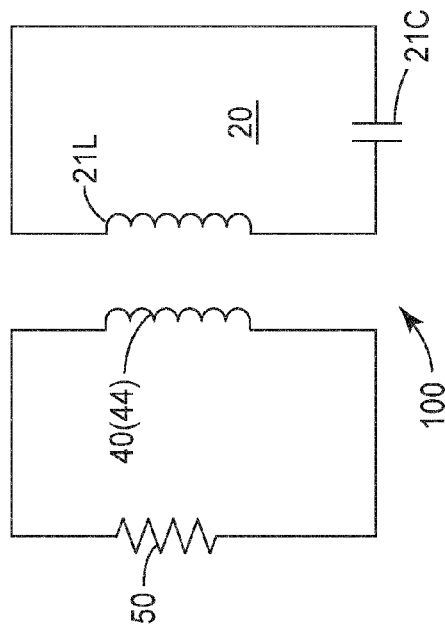
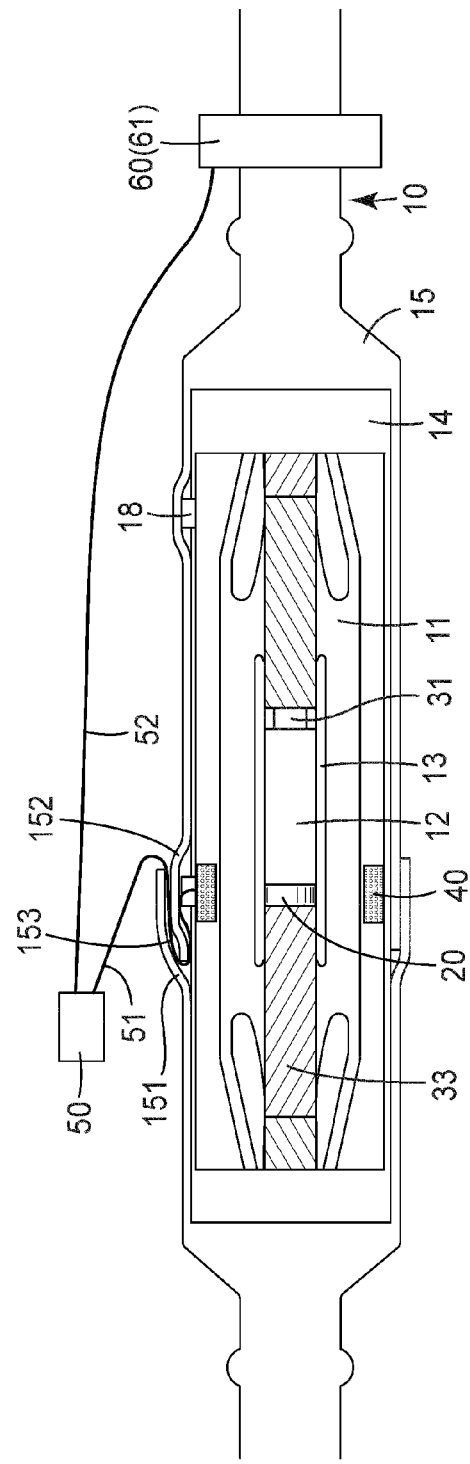

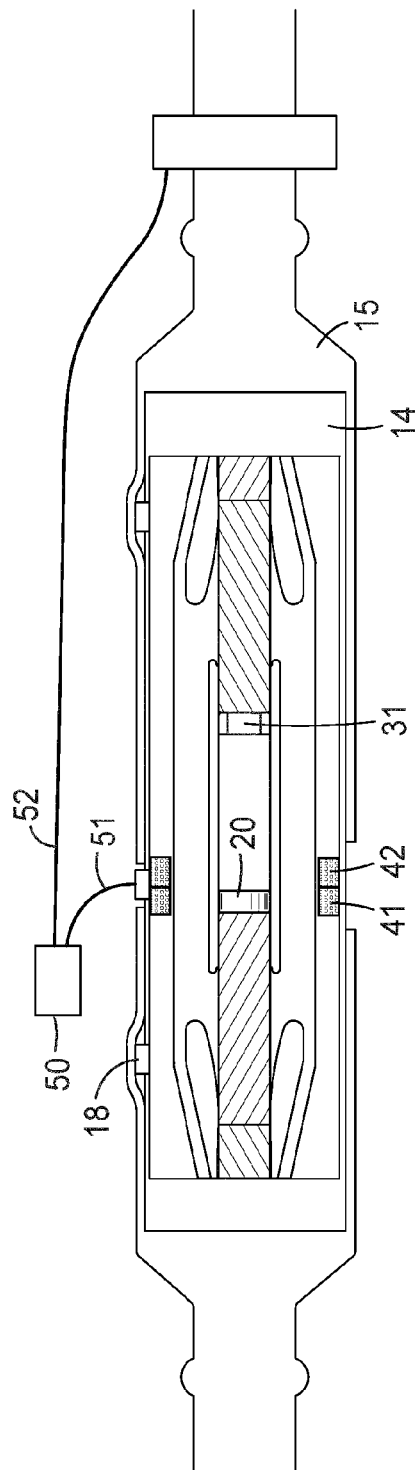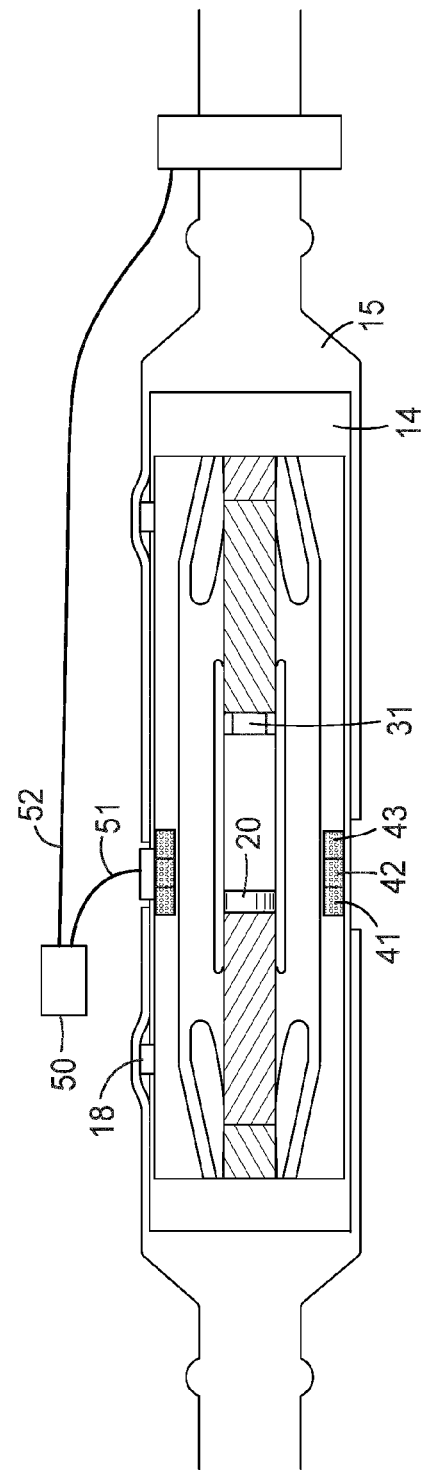

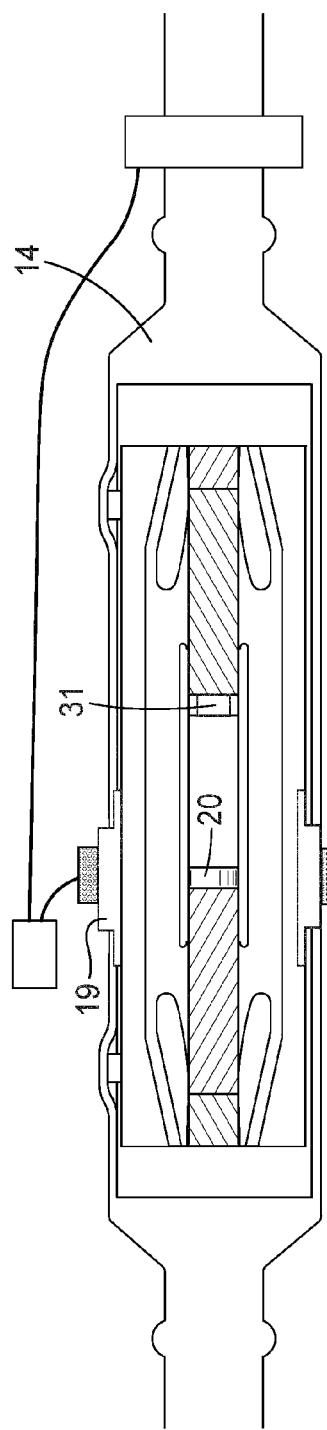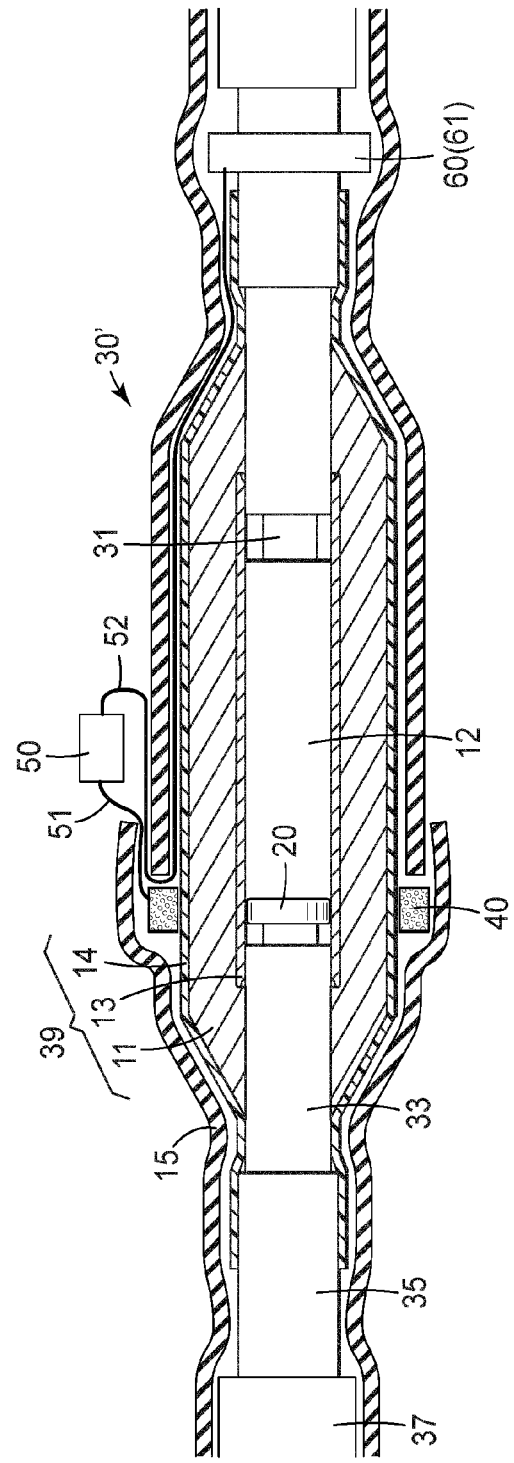

SYSTEM FOR MONITORING TEMPERATURE OF ELECTRICAL CONDUCTOR

FIELD OF THE INVENTION

The present invention generally relates to systems for monitoring temperature of an electrical conductor, and in particular, to systems for monitoring temperature of an electrical conductor enclosed in at least a (semi)conductive layer, for example, an electrical conductor of an electrical power cable in a high voltage power distribution system.

BACKGROUND OF THE INVENTION

High voltage power distribution systems play an important role in modern society. Safety and security are always considerable factors for the "health" of such high voltage power distribution system. Accordingly, there should be a technology that enables monitoring of the "health" of the high voltage power distribution system.

In a high voltage power distribution system, the temperature of conductors of electrical cables will increase as currents carried by the cables increase. Accordingly, the "health" of such system can be assessed by monitoring the temperature of the on-line electrical conductor, for example, at the cable splices or the junctions, which may be the weak points, in such a system. Usually, normal currents flowing through the cable splices or the junctions may create a temperature of up to about 90 degrees Celsius. If the temperatures of the cable splices or the junctions were to increase beyond that, it could be an indication that something may be wrong in this power distribution system. On the other hand, it is also useful to know if the existing power distribution system is at maximum current carrying capacity, to know if additional power can be reliably distributed with the existing system, or, to know if additional infrastructure expenditures are needed.

On-line power cables, as well as the cable splices and the junctions, in high voltage power distribution systems are typically insulated and protected by a number of insulative and (semi)conductive layers and are commonly buried underground or are high overhead. Therefore, it is not easy to monitor the temperature of the on-line electrical conductor, for example, directly at the cable splices or the junctions.

As used in this specification:

"(semi)conductive" indicates that the layer may be semi-conductive or conductive, depending on the particular construction.

"thermal contact" between two articles means that the articles can exchange energy with each other in the form of heat.

"direct contact" between two articles means physical contact.

FIG. 1 illustrates a type of standard high voltage cable splice assembly 30 in which two sections of an electrical cable 10 are spliced. As shown in FIG. 1, the electrical cable 10 comprises electrical conductor 31, insulation layer 33, and (semi)conductive layer 35. A connector 12 concentrically surrounds the spliced electrical conductor 31. A first (semi)conductive (or electrode) layer 13, in this case a metallic layer, concentrically surrounds the spliced electrical conductor 31 and the connector 12, forming a shielding Faraday cage around the connector 12 and electrical conductor 31. An insulating layer 11 (containing geometric stress control elements 16) surrounds the first (semi)conductive layer 13. The foregoing construction is placed inside a second (semi)conductive layer 14, in this case a metallic housing, which functions as a shield and ground layer. A resin 17 is poured into the metallic housing 14 through one of the ports 18 to fill in the area around insulating layer 11. And a shrinkable sleeve layer 15 serves as an outermost layer.

Therefore there is a need to develop a solution to monitor the temperature of an electrical conductor enclosed in at least a (semi)conductive layer, for example, in a high voltage power distribution system.

SUMMARY OF THE INVENTION

In one aspect of the present invention, a system for monitoring a temperature of an electrical conductor enclosed in at least a first (semi)conductive layer is disclosed. The system includes a passive inductive unit, and a transceiver unit and a control unit. The system optionally further includes a control unit. The passive inductive unit includes at least one temperature sensitive component and is configured to have a resonance frequency and/or Q value that varies with temperature of the electrical conductor. The temperature sensitive component has a characteristic parameter that varies with temperature and adapted to be in thermal contact with the electrical conductor. The transceiver unit is configured to be electromagnetically coupled to the passive inductive unit and to send out a signal representing the resonance frequency and/or Q value of the passive inductive unit. The transceiver unit is further configured to communicate with the control unit which ascertains the signal representing one or both of the resonance frequency and Q value, and which determines a value of the temperature of the electrical conductor based on the ascertained signal representing one or both of the resonance frequency and Q value. The control unit is configured to communicate with the transceiver unit to ascertain the signal representing the resonance frequency and/or Q value, and to determine a value of the temperature of the electrical conductor based on the ascertained signal representing the resonance frequency and/or Q value.

During operation, if there is a need to monitor the temperature of the electrical conductor, the control unit may send out an instruction signal to the transceiver unit. Once the transceiver unit receives the instruction signal, it then sends out an excitation signal to the inductive unit. The inductive unit thereby will oscillate by the excitation of the excitation signal. The transceiver unit will detect an oscillation signal from the inductive unit and then send out a feedback signal to the control unit. The oscillation signal and the feedback signal contain the information representing the resonance frequency and/or Q value of the inductive unit, which is varied with the temperature of the electrical conductor. Therefore, the control unit is able to determine a value of the temperature of the electrical conductor based on the ascertained feedback signal.

In this disclosure, the temperature of the electrical conductor (e.g. adjacent a connector) is ascertained via detecting other parameters like the resonance frequency and/or Q value of the passive inductive unit, which embody the temperature information of the electrical conductor. In contrast, many existing solutions in the art use temperature sensors mounted on the exterior surface of the power cable, and estimate the temperature at the conductor. In addition, the passive inductive unit of the present invention does not need electrical power and constitutes passive electric elements having long usage lifetimes. It thereby enables the system to be more reliable with long lifecycle.

BRIEF DESCRIPTION OF THE DRAWINGS

These and/or other aspects and advantages of the invention will become apparent and more readily appreciated from the following description of the preferred embodiments of the present invention, taken in conjunction with the accompanying drawings of which:

FIG. 1 is a partial cut-away schematic view of a prior art cable splice assembly;

FIG. 2 is a schematic block diagram of a system for monitoring temperature of an electrical conductor according to an embodiment of the present invention;

FIG. 10 is a schematic circuit diagram of a system for monitoring temperature of an electrical conductor according to an embodiment of the present invention;

FIG. 11 is a partial cut-away schematic view of application of a system for monitoring temperature of an electrical conductor according to an embodiment of the present invention, in a cable splice assembly;

FIG. 14(a) is a partial cut-away schematic view of application of a system for monitoring temperature of an electrical conductor according to an embodiment of the present invention, in a cable splice assembly;

FIG. 14(b) is a partial cut-away schematic view of application of a system for monitoring temperature of an electrical conductor according to an embodiment of the present invention, in a cable splice assembly;

FIG. 16 is a partial cut-away schematic view of application of a system for monitoring temperature of an electrical conductor according to an embodiment of the present invention, in a cable splice assembly; and FIG. 17 is a partial cut-away schematic view of application of a system for monitoring temperature of an electrical conductor according to an embodiment of the present invention, in a cable splice assembly.

Figure 3:
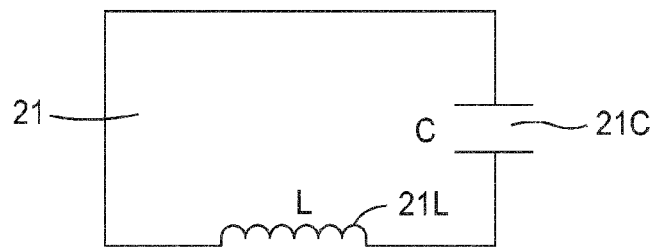
FIG. 3 is a schematic circuit diagram of an L-C loop of a system for monitoring temperature of an electrical conductor according to an embodiment of the present invention.

The scope of the present invention will in no way be limited to the simple schematic views of the drawings, the number of constituting components, the materials thereof, the shapes thereof, the relative arrangement thereof, etc., and are disclosed simply as an example of an embodiment.

DETAILED DESCRIPTION OF EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

The present disclosure provides embodiments of systems for monitoring a temperature of an electrical conductor of an electrical cable, for example, at a cable splice or junction. In some embodiments, such system and method are capable of remotely monitoring the temperature at the conductor within the cable. As mentioned above, cable splices or junctions may have the weakest current carrying capacity in a high voltage power distribution system and may have a higher possibility of failing when the current is overloaded. The systems for monitoring a temperature of an electrical conductor according to embodiments of the present invention can be used to monitor the temperature of the electrical conductor located in cable splices or junctions, so that a judgment that the electrical conductor, as well as the cable splices or junctions is working well or not can be made based on the temperature.

FIG. 2 is a schematic diagram of a system 100 for monitoring a temperature of an electrical conductor 31 according to one embodiment. The system 100 includes a passive inductive unit 20, a transceiver unit 40 and a control unit 50. The passive inductive unit 20 is configured to include at least one temperature sensitive component, for example, a temperature sensitive capacitor, a temperature sensitive inductor, a temperature sensitive switch, or a temperature sensitive resistor as described hereinafter. The temperature sensitive component has a characteristic parameter that varies with temperature and is configured to be in thermal contact with the electrical conductor 31, for example via direct contact with the outer surface of the electrical conductor 31. The passive inductive unit 20 is further configured to have a resonance frequency and/or Q value that varies with the temperature of the electrical conductor 31. The transceiver unit 40 is configured to be electromagnetically coupled to the passive inductive unit 20 and to send out a signal representing the resonance frequency and/or Q value of the inductive unit 20. The control unit 50 is configured to communicate with the transceiver unit 40 to ascertain the signal representing the resonance frequency and/or Q value, and to determine a value of the temperature of the electrical conductor 31 based on the ascertained signal representing the resonance frequency and/or Q value.

During operation, if there is a need to monitor the temperature of the electrical conductor 31, the control unit 50 may send out an instruction signal S1 to the transceiver unit 40. Once the transceiver unit 40 receives the instruction signal S1, it then sends out an excitation signal S2 to the inductive unit 20. The excitation signal S2 will induce the inductive unit 20 to oscillate. The transceiver unit 40 will detect an oscillation signal S3 from the inductive unit 20 and then send out a feedback signal S4 to the control unit 50. The oscillation signal S3 and the feedback signal S4 contain the information representing the resonance frequency and/or Q value of the inductive unit 20, which is varied with the temperature of the electrical conductor 31. Therefore, the control unit 50 is able to determine a value of the temperature of the electrical conductor 31 based on the ascertained feedback signal S4.

Alternatively, as illustrated in FIG. 2, the system 100 may further include an energy harvesting unit 60. The energy harvesting unit 60 is adapted to harvest electrical power from the electrical conductor 31 when an AC current flows through the electrical conductor 31 and to supply the harvested electrical power to the transceiver unit 40 and/or the control unit 50.

According to one embodiment, the energy harvesting unit 60 may comprise an inductive coil 61 shown in FIG. 11, such as an iron-core current transformer, an air-core current transformer, or a Rogowski coil. The inductive coil 61 can be positioned outside the first (semi)conductive layer 13, or outside the second (semi)conductive layer if one is used. Preferably, the energy harvesting unit 60 may be used mainly to provide the harvested electrical power to the transceiver unit 40, so the energy harvesting unit 60 can be positioned outside the layer in which the transceiver unit 40 is located. Thus, the energy harvesting unit 60 may be electrically connected with the transceiver unit 40 via one or more wires.

Alternatively, the energy harvesting unit 60 may further include a rectifier circuit to adapt the harvested electrical power right for the transceiver unit 40 and/or the control unit 50.

In one embodiment, the inductive unit 20 includes an LC loop 21 as shown in FIG. 3. The LC loop 21 includes an inductive coil 21L and a capacitor 21C electrically connected in series, e.g. via a wire. Alternatively, the capacitor 21C can be a temperature sensitive component, that is, a temperature sensitive capacitor, and has a capacitance that varies with temperature. In this instance, during practical application, this temperature sensitive capacitor 21C will be in thermal contact or in direct contact with the outer surface of the electrical conductor 31. The inductive coil 21L can also be the temperature sensitive component; that is, a temperature sensitive inductive coil, for which the inductance varies with temperature. In this latter instance, during practical application, this temperature sensitive inductive coil 21L will be in thermal contact or in direct contact with the outer surface of the electrical conductor 31. Alternatively, both of the capacitor 21C and the inductive coil 21L can be temperature sensitive components.

The resonance frequency fr of the L-C loop 21 can be calculated according to the formula given as below:

$$f_r = \frac{1}{2\pi\sqrt{LC}}$$

in which L denotes a value of inductance, e.g. the inductance of the inductive coil 21L; C denotes a value of capacitance, e.g. the capacitance of the capacitor 21C.

In actuality, LC loop 21 may have some resistive, dissipative, and/or absorptive loss, which can be modeled as a single small series resistance, Rs. The Q value of such an L-C loop 21 can be calculated according to the formula given below:

$$Q = \frac{\omega_0 L}{R_s} = \frac{1}{\omega_0 C R_s},$$

where $\omega_0 = 2\pi f_r$, and where fr is the resonant frequency.

It can be seen that if either the inductance or the capacitance of the L-C loop 21 is changed, the resonance frequency fr and Q value will change accordingly. In the embodiments as shown in FIG. 3, as at least one of the coil 21L and the capacitor 21C is temperature sensitive and is configured to be in thermal contact with the outer surface of the electrical conductor 31, the temperature of this temperature sensitive coil 21L and/or capacitor 21C will vary with the change in the temperature of the electrical conductor 31, thereby causing a change in the inductance or capacitance of the L-C loop 21. Consequently, the resonance frequency fr and the Q value of the L-C loop 21 is that varies with different temperature of the electrical conductor 31.

It can be understood that the L-C loop 21 may include a plurality of capacitor and/or a plurality of the inductive coil. The inductive coil can be replaced by other type of inductor.

Figure 4:
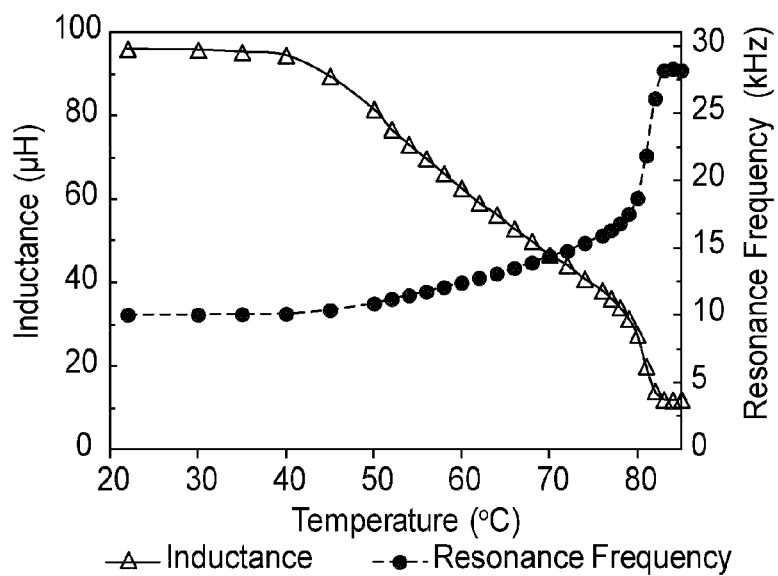
FIG. 4 is a graph showing the relationship between the temperature of an electrical conductor, the inductance of a temperature sensitive inductive coil and the resonant frequency in an L-C loop as shown in FIG. 3.

FIG. 4 is a graph showing the relationship among the temperature of the electrical conductor 31, the electric inductance of the temperature sensitive inductive coil 21L, and the resonance frequency fr of the L-C loop 21. This relationship was determined by experiments in which the temperature sensitive inductor coil 21L contained temperature sensitive ferrite with a Curie temperature of 80° C., and the capacitor 21C had a constant capacitance of 2.64 µF. From FIG. 4, it can be seen that with the increase of the temperature of the electrical conductor 31, the electric inductance of the inductive coil 21L decreases, and the resonance frequency fr of the L-C loop 21 increases accordingly. There is a specific relationship between the temperature of the electrical conductor 31 and the resonance frequency fr of the L-C loop 21. When the resonance frequency fr of the L-C loop 21 is measured, the temperature of the electrical conductor 31 can be determined using this specific relationship.

Figure 5:
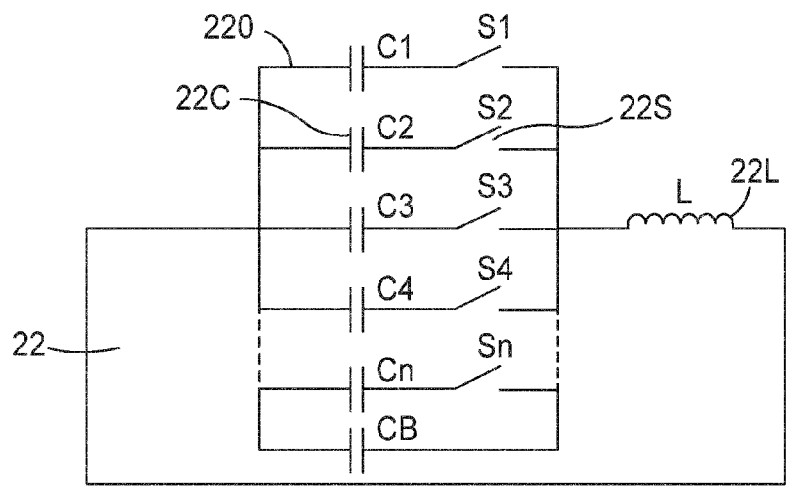
FIG. 5 is a schematic circuit diagram of an L-C loop of a system for monitoring temperature of an electrical conductor according to an embodiment of the present invention.

In another embodiment, the passive inductive unit 20 includes an L-C loop 22, shown in FIG. 5, which includes a plurality of capacitive branches 220 in parallel with one another, and an inductive coil 22L electrically connected in series with the plurality of capacitive branches 220. Each of the plurality of capacitive branches 220 includes a capacitor 22C (i.e. C1, C2, C3, C4, and so on as Cn) and a temperature-sensitive switch 22S (i.e. S1, S2, S3, S4, and so on as Sn) electrically connected in series. In practice, in consideration of energy balance, there may be a separate capacitor CB electrically connected in parallel with the plurality of capacitive branches 220. Alternatively, each capacitor 22C has constant capacitance. Each temperature-sensitive switch 22S has a unique switch-on temperature and/or a unique switch-off temperature. These switch-on or switch-off temperatures constitute continuous and non-overlapping temperature regions, such that when the electrical conductor 31 is in a specific temperature sub-region, at least one switch of the temperature-sensitive switches 22S is in switch-on state and enables the corresponding capacitive branch 220 electrically connected in series with the inductive coil 22L. Thus, for a specific temperature sub-region, e.g. 85° C.-90° C., the L-C loop 22 has a unique capacitance, and consequently the L-C loop 22 has a unique resonance frequency fr and/or Q value. In practice application, the plurality of temperature-sensitive switch 22S will be in thermal contact or direct contact with the outer surface of the electrical conductor 31 so that the temperature of the switch 22S is the same with that of the electrical conductor 31.

Figure 6:
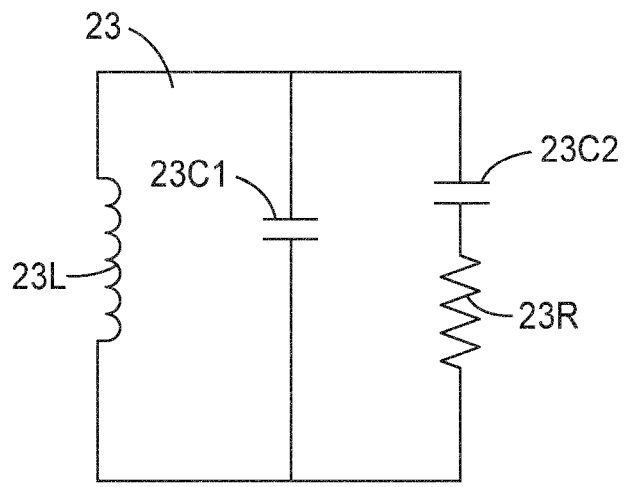
FIG. 6 is a schematic circuit diagram of an L-C loop of a system for monitoring temperature of an electrical conductor according to an embodiment of the present invention.

In another embodiment, the passive inductive unit 20 includes an L-C loop 23 as shown in FIG. 6. The L-C loop 23 includes an inductive coil 23L and a first capacitor 23C1 electrically connected in series, and a temperature sensitive resistor 23R is connected in parallel with the first capacitor 23C1 and the inductive coil 23L. The temperature sensitive resistor 23R is configured to have a resistance that varies with temperature. Further, a second capacitor 23C2 may be connected in series with the temperature sensitive resistor 23R. The temperature sensitive resistor 23R is configured to be in thermal contact with the outer surface of the electrical conductor 31 in practical application. To be simple, preferably, the inductive coil 23L, first capacitor 23C1, and the second capacitor 23C2 can be temperature insensitive components.

Figure 7:
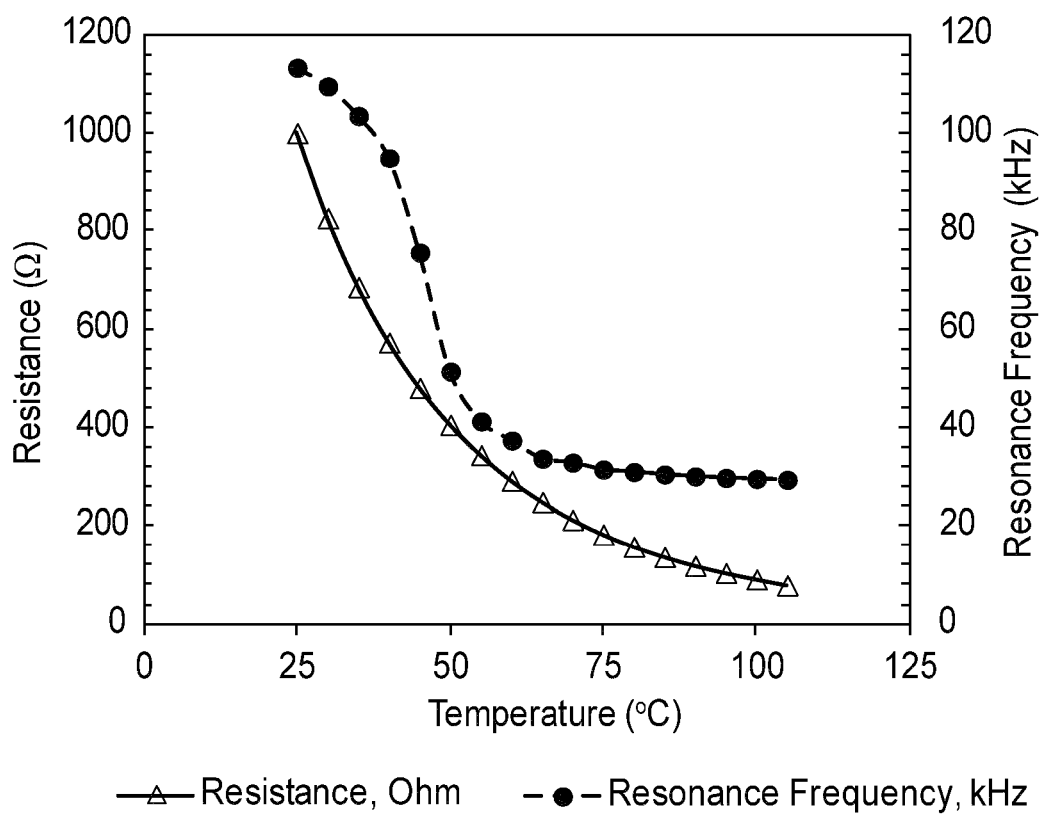
FIG. 7 is a graph showing the relationship between the temperature of an electrical conductor, the electrical resistance of one temperature sensitive resistor, and the resonant frequency in an L-C loop as shown in FIG. 6.

FIG. 7 is a graph showing the relationship among the temperature of the electrical conductor 31, the electrical resistance of the temperature sensitive resistor 23R in the L-C loop 23, and the resonant frequency of the L-C loop 23 according to the embodiment shown in FIG. 6. In FIG. 7, the X axis represents the temperature of the electrical conductor 31, the left Y axis represents the resistance of the temperature sensitive resistor 23R, and the right Y axis represents resonant frequency of the L-C loop 23. From FIG. 7, it can be seen that with the increase of the temperature of the electrical conductor 31, the resistance of the temperature sensitive resistor 23R decreases, and the resonance frequency fr of the L-C loop 23 decreases accordingly. There is a specific relationship between the temperature of the electrical conductor 31 and the resonance frequency fr of the L-C loop 23. When the resonance frequency fr of the L-C loop 23 is measured, the temperature of the electrical conductor 31 can be determined using this specific relationship.

Figure 8:
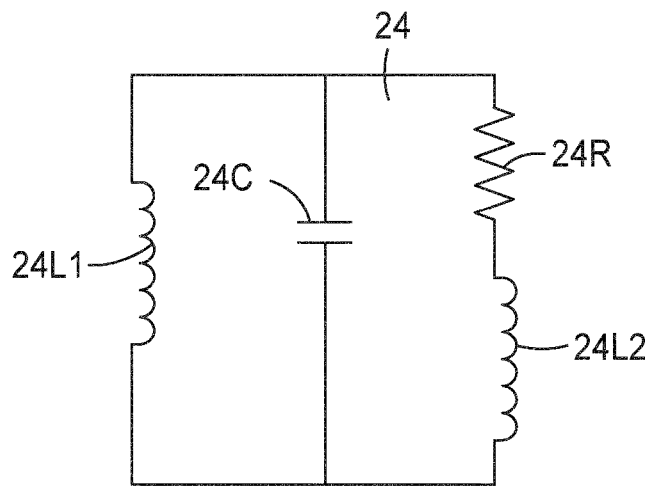
FIG. 8 is a schematic circuit diagram of an L-C loop of the system for monitoring temperature of an electrical conductor according to an embodiment of the present invention.

In another embodiment, the passive inductive unit 20 includes an L-C loop 24, as shown in FIG. 8. The L-C loop 24 is a small variation of the L-C loop 23 shown in FIG. 6. The L-C loop 24 includes a first inductive coil 24L1 and a capacitor 24C electrically connected in series, and a temperature sensitive resistor 24R is connected in parallel with the capacitor 24C and the first inductive coil 24L1. The temperature sensitive resistor 24R is configured to have a resistance that varies with temperature. Further, a second inductor 24L2 is connected in series with the temperature sensitive resistor 24R. The temperature sensitive resistor 24R is configured to be in thermal contact with the outer surface of the electrical conductor 31 in practical application. To be simple, preferably, the first inductive coil 24L1, the second capacitor inductive coil 24L2 and the capacitor 24C can be temperature insensitive components.

Figure 9:
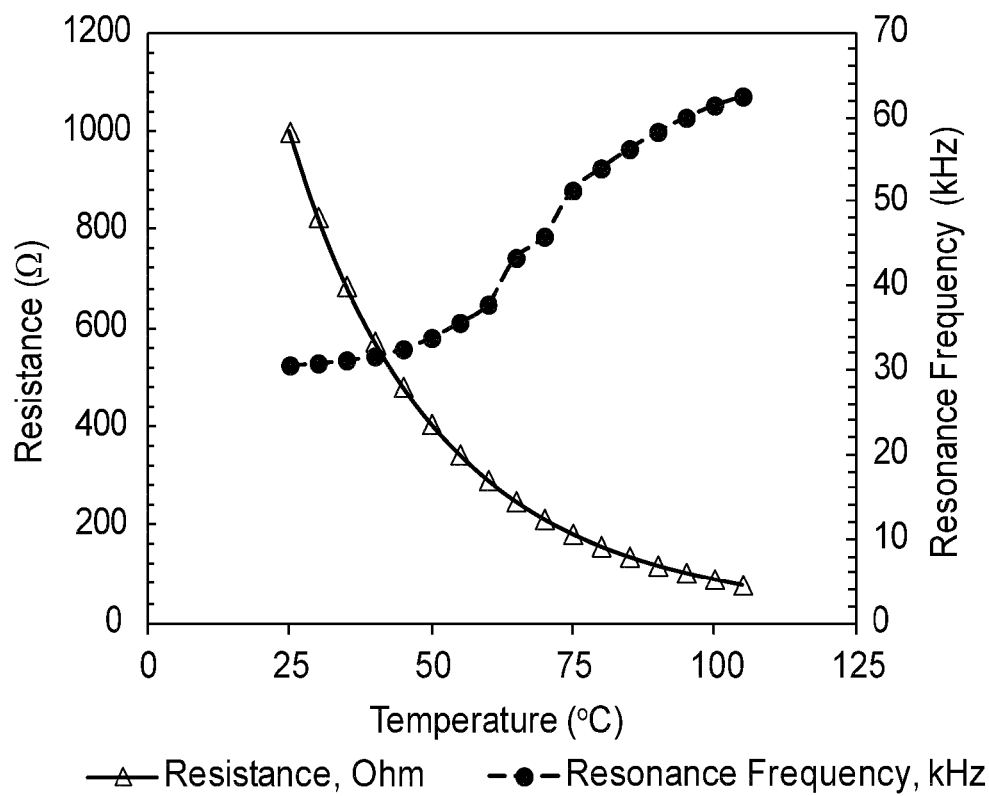
FIG. 9 is a graph showing the relationship between the temperature of an electrical conductor, the electrical resistance of the temperature sensitive resistor, and the resonant frequency in an L-C loop as shown in FIG. 8.

FIG. 9 is a graph showing the relationship among the temperature of the electrical conductor 31, the electrical resistance of the temperature sensitive resistor 24R in the L-C loop 24, and the resonant frequency of the L-C loop 24 according to the embodiment shown in FIG. 8. In FIG. 9, the X axis represents the temperature of the electrical conductor 31, the left Y axis represents the resistance of the temperature sensitive resistor 23R, and the right Y axis represents resonant frequency of the L-C loop 23. From FIG. 9, it can be seen that with the increase of the temperature of the electrical conductor 31, the resistance of the temperature sensitive resistor 24R decreases, and the resonance frequency fr of the L-C loop 24 increases accordingly. There is a specific relationship between the temperature of the electrical conductor 31 and the resonance frequency fr of the L-C loop 24. When the resonance frequency fr of the L-C loop 24 is measured, the temperature of the electrical conductor 31 can be determined using this specific relationship.

Just like the embodiments shown in FIGS. 6 and 8, the resonance frequency and/or Q value of the passive inductive unit 20 may be also ascertained based on the change in resistance of the temperature sensitive resistor.

In another aspect, besides the L-C loop 21, 22, 23, 24 disclosed above, the passive inductive unit 20 may further include a signal transceiver component, which is configured to transmit signal between the L-C loop and the transceiver unit 40, for example, to receive and send out signals from and to the transceiver unit 40. The signal transceiver component can be in series or parallel connection with the L-C loop and can be an inductive coil electromagnetically coupled to the transceiver unit 40 or an antenna.

In some practical applications, the electrical conductor 31 may be enclosed within conductive material, for example a metallic sheet, in a way that an antenna signal may not be transmitted out through the conductive material with a satisfactory quality. Then the inductive coil used as the signal transceiver component electromagnetically coupled to the transceiver unit 40 will be a good choice to transmit the oscillation signal of the L-C loop out through the conductive material. Thus, an inductive coil can be used as the signal transceiver component. Even more preferably, this inductive coil can be the same one used in the L-C loop 21, 22, 23, 24. That is, the inductive coil or the temperature sensitive inductive coil 21L, 22L, 23L, 24L1 respectively illustrated in the L-C loop 21, 22, 23, 24 may have two functions, one is signal transmission and another one is to contribute inductance to the L-C loop. In this instance, the components in the system can be fewer and bring cost saving advantage.

In this disclosure, the temperature determination of the electrical conductor is ascertained via detecting other parameters like the resonance frequency and/or Q value of the passive inductive unit, which embody the temperature information of the electrical conductor. In contrast, existing solutions in the art often use temperature sensors mounted on the exterior surface of the power cable, and estimate the temperature at the conductor. In addition, the passive inductive unit of the present invention does not need electrical power and constitutes passive electric elements having long usage lifetimes. It thereby enables the system to be more reliable with long lifecycle.

The transceiver unit 40 is provided to be in communication with the passive inductive unit 20 and the control unit 50. In practice, as the transceiver unit 40 and the control unit 50 may be both located outside the first (semi)conductive layer which encloses the electrical conductor (31) to be monitored, it may be easy to set up the communication between the transceiver unit 40 and the control unit 50, for example, via one or more wires. However, as the passive inductive unit 20 is commonly located inside the first (semi)conductive layer, it may be difficult to set up the communication between the transceiver unit 40 and the passive inductive unit 20 if the first (semi)conductive layer has a strong blocking effect on the antenna signal. Some embodiments of this disclosure propose to use an electromagnetic coupling relationship between the transceiver unit 40 and the passive inductive unit 20 to enable the communication, so as to detect a signal embodying the resonance frequency and/or Q value of the passive inductive unit 20.

Figure 15:
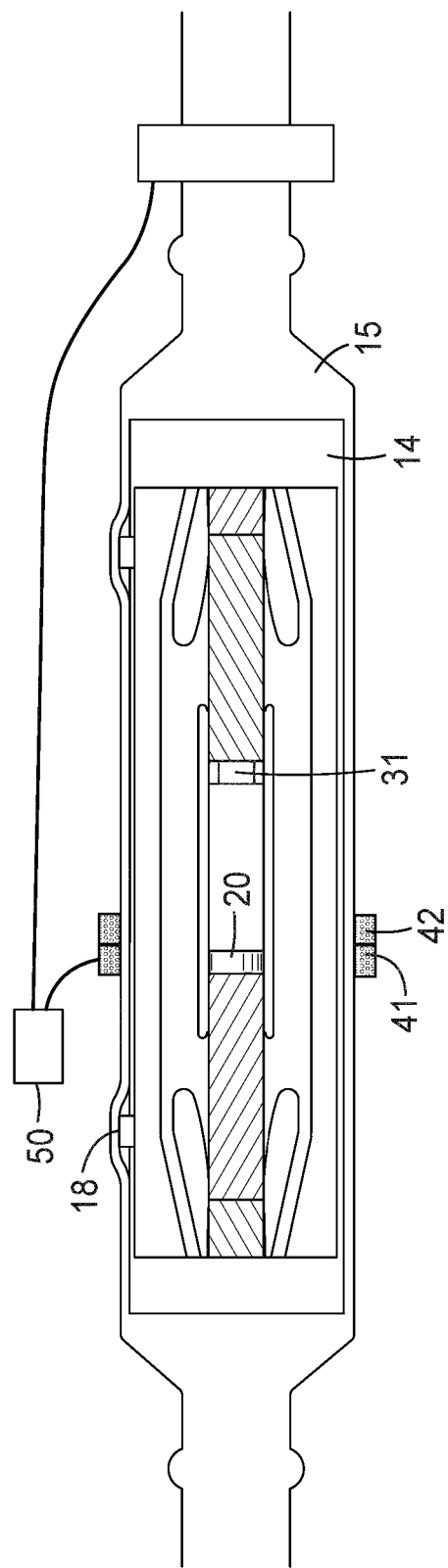
FIG. 15 is a partial cut-away schematic view of application of a system for monitoring temperature of an electrical conductor according to an embodiment of the present invention, in a cable splice assembly.

In some embodiments, as shown in FIGS. 14(a), 14(b), and 15, the transceiver unit 40 may include an inductive transmitting coil 42 and an inductive receiving coil 41. The inductive transmitting coil 42 is configured to emit an excitation signal under the control of control unit 50 so as to cause the passive inductive unit 20 to oscillate. The inductive receiving coil 41 is configured to oscillate with the oscillation of the passive inductive unit 20 so as to generate a feedback signal (i.e. an oscillation signal) to the control unit 50. In practical application, both the inductive transmitting coil 42 and the inductive receiving coil 41 are in electromagnetic coupling with the passive inductive unit 20, for example, via the inductive coil or the temperature sensitive inductive coil 21L, 22L, 23L, 24L1. Alternatively, the inductive transmitting coil 42 and the inductive receiving coil 41 may be configured to have different frequencies, and in this instance, a better communication quality can be ascertained.

In another embodiment, as shown in FIG. 10, the transceiver unit 40 includes an inductive coil 44 which is configured to emit an excitation signal which induces oscillation in the passive inductive unit 20 and also to oscillate with the oscillation of the passive inductive unit 20. That means this inductive coil 44 has the functions that are provided by the inductive transmitting coil 42 and the inductive receiving coil 41 together. In this instance, the system can include fewer components and thereby a simpler structure.

The foregoing description has illustrated some examples of the passive inductive unit 20 and the transceiver unit 40. FIG. 10 illustrates a schematic circuit of the system 100 as an example according to an embodiment of the present invention. The system 100 includes a passive inductive unit 20 formed by the inductive coil 21L and the temperature sensitive capacitor 21C, transceiver unit 40 formed by the inductive coil 44 as mentioned above, and control unit 50. The inductive coil 21L of the passive inductive unit 20 is electromagnetically coupled to the inductive coil 44 of the transceiver unit 40, which is electrically connected to the control unit 50.

As mentioned above, the control unit 50 is configured to communicate with the transceiver unit 40 to ascertain a signal representing the resonance frequency and/or Q value of the passive inductive unit 20, and to determine a value of the temperature of the electrical conductor 31 based on the ascertained signal representing the resonance frequency and/or Q value. The control unit 50 may be remotely located outside the second (semi)conductive layer 14. The control unit 50 may be electrically connected to the transceiver unit 40, for example, via one or more wires. The control unit 50 may comprise an algorithmic table to show a relationship between the value of the temperature of the electrical conductor 31 and the value of the resonance frequency and/or Q value. The algorithmic table may be given from experiments or tests.

An example of such experiments is given based on an embodiment of a system as shown in FIG. 10. Copper conductor was used as the tested electrical conductor, the inductive coil 21L of the passive inductive unit 20 had an electrical inductance of 1.24 mH and the temperature sensitive capacitor 21C had an electrical capacitance of 17 nF at 25° C. Values of capacitance of the temperature sensitive capacitor 21C varied in accordance with the change in the temperature of the copper electrical conductor, in a ratio of 100 pF per one Celsius degree.

The copper conductor was heated to different temperatures and the corresponding values of the resonance frequency and/or Q were measured. Through these experiments, various values of the temperature of the electrical conductor 31 and corresponding values of the resonance frequency and/or Q were ascertained as shown in Table 1.

TABLE 1

| Temperature (° C.) | Resonance Frequency (kHz) | Q Value |
| --- | --- | --- |
| 30 | 34.1 | 36.08 |
| 35 | 33.5 | 35.98 |
| 40 | 33.0 | 36.12 |
| 45 | 32.4 | 36.04 |
| 50 | 31.9 | 36.02 |
| 55 | 31.4 | 36.25 |
| 60 | 30.9 | 36.42 |
| 65 | 30.5 | 37.53 |
| 70 | 30.0 | 37.47 |
| 75 | 29.6 | 38.19 |
| 80 | 29.2 | 39.31 |
| 85 | 28.7 | 38.63 |
| 90 | 28.3 | 39.98 |
| 95 | 27.9 | 39.11 |

FIGS. 11 to 17 illustrate various suitable locations that the passive inductive unit 20, the transceiver unit 40, and the control unit 50 can be positioned when the system is used to monitor temperature of an electrical conductor 31, for example enclosed in a high voltage cable splice assembly.

According to one embodiment of the present invention, as illustrated in FIG. 11, which shows an embodiment of the present invention applied to measure the temperature of an electrical conductor 31 enclosed in a cable splice assembly. In this embodiment, portions of the electrical conductor 31 are covered by a connector 12 and then are enclosed by a first (semi)conductive layer 13, an insulating layer 11, a second (semi)conductive layer 14, and a shrinkable sleeve layer 15. In this embodiment, the shrinkable sleeve layer 15 includes two overlapping sections 151 and 152 to leave a passage 153 between the overlapping portions. The passage 153 is from the outside of the shrinkable sleeve layer 15 through the port 18 on the second (semi)conductive layer 14 to the inside of the second (semi)conductive layer 14.

As shown in FIG. 11, the passive inductive unit 20 is positioned close to the electrical conductor 31 and inside the first (semi)conductive layer 13. Preferably, a portion of the electrical conductor 31 is exposed between the insulation layer 33 of the cable 10 and the connector 12, and the passive inductive unit 20 may be positioned around the exposed portion of the electrical conductor 31. More detailed description about the position of the passive inductive unit 20 will be given hereinafter with reference to FIG. 12.

The transceiver unit 40 is positioned outside the first (semi)conductive layer 13 and inside the second (semi)conductive layer 14, i.e. between the first (semi)conductive layer 13 and the second (semi)conductive layer 14. Preferably, the transceiver unit 40 and the passive inductive unit 20 are located in a same cross section, so as to improve the electromagnetic coupling. In the case that an inductive coil 44 functions as the transceiver unit 40 as illustrated in FIG. 10, the inductive coil 44 can be wound around the insulating layer 11. More detailed description about embodiments of the transceiver unit 40 and its positioning will be provided hereinafter with reference to FIGS. 13-15.

The control unit 50 is configured to communicate with the transceiver unit 40 through wire 51. The wire 51 can be accommodated within passage 153 so that the wire 51 can extend from transceiver unit 40, through port 18, to control unit 50. The energy harvesting unit 60 including a power inductive coil 61 can be located outside the assembly 30 and around the cable 10, or located between the second (semi) conductive layer 14 and the shrinkable sleeve layer 15. The energy harvesting unit 60 is used to supply power to the transceiver unit 40 and/or the control unit 50 through wire 52. Throughout this specification, although wire 51 and wire 52 are each referred to as a "wire," it should be understood that either or both of wire 51 and wire 52 may comprise multiple wires as needed for the system to function.

Figure 12:
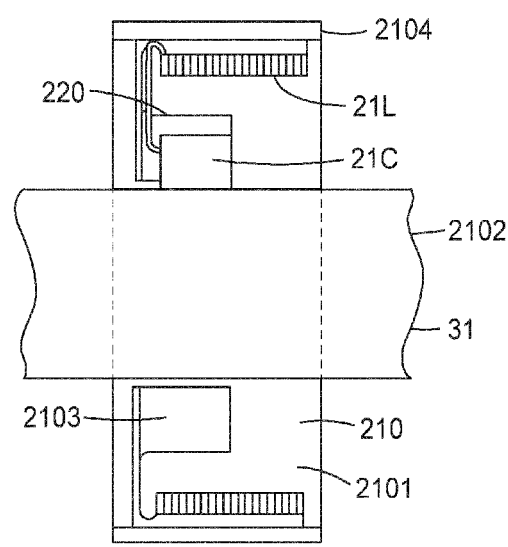
FIG. 12 is a sectional view of a portion of the electrical conductor in a cable splice assembly, for which the passive inductive unit of the system according to one embodiment of the present invention is applied.

FIG. 12 is an enlarged view illustrating an exemplary location of the passive inductive unit 20. As an example, the passive inductive unit 20 includes the inductive coil 21L and the capacitor 21C which is a temperature sensitive component, as shown in FIG. 3. The inductive coil 21L and the temperature sensitive capacitor 21C is electrically connected via a wire 220. A fixture 210 is provided to install the inductive coil 21L and the capacitor 21C. For example, the fixture 210 may include a main body 2101 and a channel 2102. The channel 2102 is adapted to accommodate the electrical conductor 31 to have the conductor 31 pass through the channel 2102. The main body 2101 has a chamber 2103 to accommodate the temperature sensitive capacitor 21C and the chamber 2103 can communicate with the channel 2102 in a way that the temperature sensitive capacitor 21C can be in thermal contact or direct contact with the outer surface of the electrical conductor 31 in operation. The inductive coil 21L is adapted to wind around the main body 2101. The fixture 210 further includes a cover 2104 to enclose the main body 2101.

In the case that the inductive coil 21L is a temperature sensitive component, the inductive coil 21L can be wound directly around the electrical conductor 31 and in direct contact with the outer surface of the electrical conductor 31.

Figure 13:
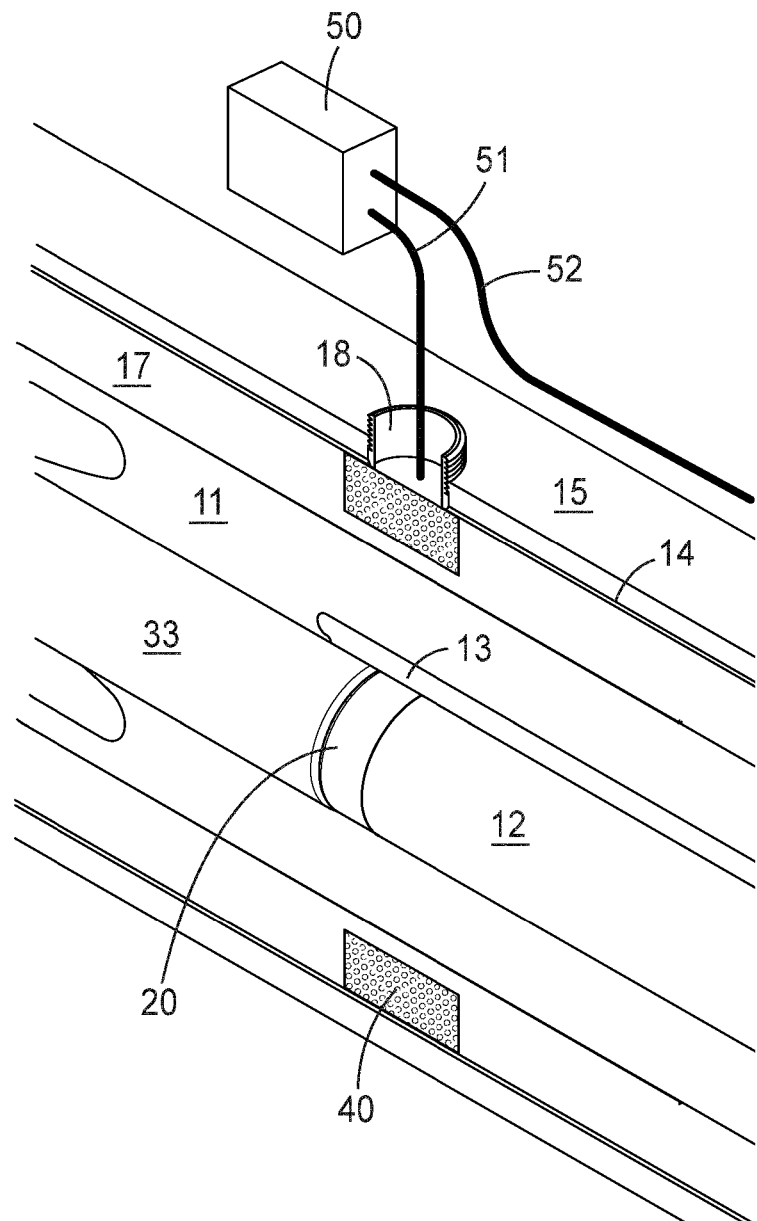
FIG. 13 is a partial cross-section perspective view of a portion of the cable splice assembly of FIG. 11, but having a different shrinkable sleeve layer.

FIG. 13 illustrates a closer perspective view of inductive unit 20 placed on the electrical conductor 31 adjacent to connector 12. In this embodiment, shrinkable sleeve layer 15 is continuous and a hole has been cut in shrinkable sleeve layer 15 to accommodate port 18 and allow the egress of wire 51.

FIG. 14(a) illustrates another embodiment of the present invention in which a separate receiving coil 41 and transmitting coil 42 are used as transceiver unit 40. In this embodiment, both receiving coil 41 and transmitting coil 42 are located within second (semi)conductive layer 14. Transmitting coil 42 is positioned so that the excitation signal it emits will cause the passive inductive unit 20 to oscillate, and the receiving coil 41 is positioned so that it is centered approximately radially with inductive unit 20 to allow receiving coil 41 to oscillate with the oscillation of the passive inductive unit 20. Receiving coil 41 and transmitting coil 42 are separately connected to control unit 50 by wire 51. In this embodiment, the two sections of shrinkable sleeve 15 do not overlap, leaving a portion of second (semi)conductive layer 14 exposed.

FIG. 14(b) illustrates another embodiment of the present invention in which transceiver unit 40 comprises a separate first receiving coil 41, transmitting coil 42, and second receiving coil 43. In this embodiment, first receiving coil 41, transmitting coil 42, and second receiving coil 43 are located within second (semi)conductive layer 14. Transmitting coil 42 is positioned so that the excitation signal it emits will cause the passive inductive unit 20 to oscillate, and the receiving coil 41 is positioned so that it is centered approximately radially with inductive unit 20 to allow receiving coil 41 to oscillate with the oscillation of the passive inductive unit 20. First and second receiving coils 41, 43 and transmitting coil 42 are separately connected to control unit 50 by wire 51. In some embodiments, first receiving coil 41 and second receiving coil 43 are connected in series but may be wound in alternating directions. This configuration may reduce noise and improve the signal to noise ratio of the system. As in FIG. 14(a), in this embodiment, the two sections of shrinkable sleeve 15 do not overlap, leaving a portion of second (semi)conductive layer 14 exposed.

FIG. 15 illustrates another embodiment of the present invention similar to the embodiment of FIG. 14(a) except that receiving coil 41 is also located outside metal housing 14. Similar configurations could be used in which transceiver unit 40 is used and comprises separate receiving coil 41 and transmitting coil 42 (as shown in FIG. 11), or in which a second receiving coil is also used (as shown in FIG. 14(b)). The coils may be inside or outside of shrinkable sleeve 15. In FIG. 15, they are shown outside of shrinkable sleeve 15.

FIG. 16 illustrates another embodiment of the present invention used for a splice assembly 30 in which the second (semi)conductive layer 14 comprises a metal housing that includes insulative metallic shield sectionalizer 19, which provides a ring of insulative material between two sections of second (semi)conductive layer (conductive metal housing) 14. Metal housings of this type, for example, in which the metallic shield sectionalizer 19 comprises a fiberglass insert, are commercially available. When using this type of metal housing, the transceiver unit 40 can be placed around and outside of the insulative metallic shield sectionalizer 19. In this embodiment, transceiver unit 40 will be able to easily read information from the inductive unit 20 through the insulative material. Similar configurations could be used in which transceiver 40 is replaced with one or two separate receiving coil(s) 41, 43, and transmitting coil 42.

FIG. 17 illustrates another embodiment of the present invention used for a different type of standard splice assembly 30' comprising a polymeric multilayer splice body 39. The splice body 39 may comprise suitable materials such as ethylene propylene diene monomer (EPDM) rubber or silicone rubber. The splice body 39 may be cold shrinkable or push on and typically consists of three layers, which include first (semi)conductive layer 13, insulating layer 11, and second (semi)conductive layer 14. An additional conductive shield (not shown) may be applied over second (semi)conductive layer 14, prior to application of shrinkable sleeve layer 15, which is shown as two separate pieces, to allow for egress of wires 51, 52. Shrinkable sleeve layer 15 is insulative and overlaps a portion of cable jacket 37. A commercially available splice body of this type is 3M™ Cold Shrink QS-III Splice Kit, 3M Company, USA. As illustrated in FIG. 17, inductive unit 20 is attached to an outer surface of the electrical conductor 31. Transceiver unit 40 is located outside of second (semi)conductive layer 14 and beneath shrinkable sleeve layer 15. Transceiver unit 40 may comprise a single coil 44, separate receiving coil 41 and transmitting coil 42, or separate first receiving coil 41, transmitting coil 42, and second receiving coil 43. In embodiments in which second (semi)conductive layer 14 is polymeric and/or semi-conductive, transceiver 40 can more easily communicate with inductive unit 20 than in embodiments in which (semi)conductive layer 14 is a metal. In embodiments in which an additional conductive layer, such as a wire mesh shield sock, is used over second (semi)conductive layer 14, the additional conductive layer can be placed over or under transceiver 40. Power inductive coil 61 of energy harvesting unit 60 is located on (semi)conductive layer 35 of cable 10. In an alternate embodiment, one or more of the first (semi) conductive layer 13, insulating layer 11, and second (semi) conductive layer 14 may be formed separately. For example, second (semi)conductive layer 14 may be formed separately from first (semi)conductive layer 13 and insulating layer 11. In this embodiment, transceiver coil 40 could be placed beneath second (semi)conductive layer 14.

What is claimed is:

1. A system for monitoring a temperature of an electrical conductor enclosed in at least a first semiconductive layer, wherein a semiconductive layer is a layer that can be semiconductive or conductive, the system comprising:
    a passive inductive unit, comprising at least one temperature sensitive component having a characteristic parameter that varies with temperature and is adapted to be in thermal contact with the electrical conductor, and configured to have one or both of a resonance frequency and Q value that varies with the temperature of the electrical conductor; and
    a transceiver unit, electromagnetically coupled to said passive inductive unit and configured to send out a signal representing one or both of the resonance frequency and Q value of said passive inductive unit;
    wherein, the transceiver unit is further configured to communicate with a control unit which ascertains the signal representing one or both of the resonance frequency and Q value, and which determines a value of the temperature of the electrical conductor based on the ascertained signal representing one or both of the resonance frequency and Q value, where the Q value is defined as $$Q = \frac{\omega_0 L}{R_s} = \frac{1}{\omega_0 C R_s},$$

where $\omega_0 = 2\pi f_r$, C denotes a value of capacitance, Rs is a representative single small series resistance of resistive, dissipative, and/or absorptive loss, and where fr is the resonant frequency.

2. The system according to claim 1, wherein the temperature sensitive component is adapted to be in direct contact with an outer surface of the electrical conductor.

3. The system according to claim 1, wherein said passive inductive unit comprises an LC loop having an inductive coil and a capacitor electrically connected in series.

4. The system according to claim 3, wherein in the LC loop, one or both of (i) the capacitor is a temperature sensitive component and has a capacitance that varies with temperature and, (ii) the inductive coil is a temperature sensitive component and has an inductance that varies with temperature.

5. The system according to claim 1, wherein the passive inductive unit comprises an LC loop including a plurality of capacitive branches in parallel with one another, and an inductive coil electrically connected in series with said plurality of capacitive branches; wherein each of said plurality of capacitive branches includes a capacitor having constant capacitance and a temperature-sensitive switch electrically connected in series.

6. The system according to claim 5, wherein each of said temperature-sensitive switches of said plurality of capacitive branches has a unique switch-on temperature and/or a unique switch-off temperature, and these switch-on and/or switch-off temperatures constitute continuous and non-overlapping temperature regions, such that when the electrical conductor is in a specific temperature region, at least one switch of said temperature-sensitive switches is in switch-on state and enables the corresponding capacitive branch electrically connected in series with the inductive coil.

7. The system according to claim 1, wherein said passive inductive unit comprises an LC loop including an inductive coil and a capacitor electrically connected in series, and a temperature sensitive resistor connected in parallel with said capacitor and said inductive coil; and, the temperature sensitive resistor is configured to have a resistance that varies with temperature.

8. The system according to claim 7, wherein said LC loop further comprises another capacitor or another inductive coil connected in series with said temperature sensitive resistor.

9. The system according to claim 1, wherein said transceiver unit is configured to be located outside the first semiconductive layer, and comprises at least one inductive coil configured to emit an excitation signal to cause the passive inductive unit to oscillate and to oscillate with the oscillation of the passive inductive unit.

10. The system according to 1, wherein said transceiver unit is configured to be located outside the first semiconductive layer, and comprises an inductive transmitting coil configured to emit an excitation signal to cause the passive inductive unit to oscillate and an inductive receiving coil configured to oscillate with the oscillation of the passive inductive unit.

11. The system according to claim 1, wherein said transceiver unit is configured to be located outside the first semiconductive layer, and comprises at least one inductive transmitting coil configured to emit an excitation signal to cause the passive inductive unit to oscillate, and at least two inductive receiving coil(s) configured to oscillate with the oscillation of the passive inductive unit.

12. The system according to claim 9, wherein the first semi(conductive) layer is enclosed in a second semiconductive layer, the transceiver unit is located inside the second (semi) conductive layer, the control unit is configured to be located outside second semiconductive layer and the control unit is electrically connected to the transceiver unit via a wire.

13. The system according to claim 9, wherein the first semiconductive layer is enclosed in a second semiconductive layer, the transceiver unit are located outside the second semiconductive layer, the control unit is configured to be located outside the second semiconductive layer, and the control unit is electrically connected to the transceiver unit via a wire.

14. The system according to claim 1, further comprising an energy harvesting unit, wherein the energy harvesting unit comprises a power inductive coil adapted to harvest electrical power from the electrical conductor when an AC current flows through the electrical conductor, and to supply the harvested electrical power to one or both of said transceiver unit and said control unit.

15. The system according to claim 14, wherein said power inductive coil of said energy harvesting unit is configured to be positioned outside the first semiconductive layer and to be electrically connected with one or both of said transceiver unit and said control unit.

16. The system according to claim 1, further comprising a control unit configured to communicate with said transceiver unit to ascertain the signal representing one or both of the resonance frequency and Q value, and to determine a value of the temperature of the electrical conductor based on the ascertained signal representing one or both of the resonance frequency and Q value.

17. The system according to claim 1, wherein said control unit is configured to determine a value of one or both of the resonance frequency and Q value from the signal and comprises an algorithmic table to show a relationship between the value of the temperature of the electrical conductor and the value of one or both of the resonance frequency and Q value.

18. The system according to claim 17, wherein various values of the temperature of the electrical conductor and corresponding values of one or both of the resonance frequency and Q value are determined by a plurality of experimental tests, and the relationship between the value of the temperature of the electrical conductor and the value of one or both of the resonance frequency and Q value is set up based on the tested values.

19. An article comprising: a passive inductive unit, comprising at least one temperature sensitive component having a characteristic parameter that varies with temperature and is adapted to be in thermal contact with an electrical conductor, configured to have one or both of a resonance frequency and Q value that varies with the temperature of the electrical conductor, and configured to be coupled to a transceiver unit, which is configured to send out a signal representing one or both of the resonance frequency and Q value of said passive inductive unit.

* * * * *

UNITED STATES PATENT AND TRADEMARK OFFICE
CERTIFICATE OF CORRECTION

Page 1 of 1

PATENT NO. : 9,885,618 B2
APPLICATION NO. : 14/888856
DATED : February 6, 2018
INVENTOR(S) : Denny Wen It is certified that error appears in the above-identified patent and that said Letters Patent is hereby corrected as shown below:

In the Claims

<u>Column 14</u>
Line 28, In Claim 10, after "to" insert -- claim --.

Signed and Sealed this
Second Day of October, 2018

Andrei Iancu
*Director of the United States Patent and Trademark Office*